US 12,111,880 B2

United States Patent
Naruniec et al.

(10) Patent No.: US 12,111,880 B2
(45) Date of Patent: Oct. 8, 2024

(54) FACE SWAPPING WITH NEURAL NETWORK-BASED GEOMETRY REFINING

(71) Applicants: DISNEY ENTERPRISES, INC., Burbank, CA (US); ETH Zürich (Eidgenössische Technische Hochschule Zürich), Zürich (CH)

(72) Inventors: Jacek Krzysztof Naruniec, Windlach (CH); Derek Edward Bradley, Zurich (CH); Paulo Fabiano Urnau Gotardo, Zurich (CH); Leonhard Markus Helminger, Zurich (CH); Christopher Andreas Otto, Zurich (CH); Christopher Richard Schroers, Uster (CH); Romann Matthew Weber, Uster (CH)

(73) Assignees: DISNEY ENTERPRISES, INC., Burbank, CA (US); ETH Zurich (Eidgenssische Technische Hochschule Zurich), Zürich (CH)

( * ) Notice: Subject to any disclaimer, the term of this patent is extended or adjusted under 35 U.S.C. 154(b) by 440 days.

(21) Appl. No.: 17/484,681

(22) Filed: Sep. 24, 2021

(65) Prior Publication Data
US 2022/0374649 A1 Nov. 24, 2022

Related U.S. Application Data

(60) Provisional application No. 63/191,246, filed on May 20, 2021.

(51) Int. Cl.
*G06T 17/20* (2006.01)
*G06F 18/21* (2023.01)
(Continued)

(52) U.S. Cl.
CPC ............. *G06F 18/21* (2023.01); *G06N 3/045* (2023.01); *G06N 3/088* (2013.01); *G06T 11/001* (2013.01);
(Continued)

(58) Field of Classification Search
CPC ........ G06F 18/21; G06N 3/045; G06N 3/088; G06N 3/0455; G06N 3/08; G06T 11/001;
(Continued)

(56) References Cited

U.S. PATENT DOCUMENTS

| | | | |
|---|---|---|---|
| 2014/0210840 A1* | 7/2014 | Ellis | H04N 19/463 345/587 |
| 2019/0043322 A1* | 2/2019 | Tachi | G06F 3/016 |

(Continued)

OTHER PUBLICATIONS

Github, "Face-Parsing PyTorch", Retrieved from https://github.com/zllrunning/face-parsing.PyTorch, on Oct. 6, 2021, May 18, 2019, 4 pages.
(Continued)

*Primary Examiner* — Ali Bayat
(74) *Attorney, Agent, or Firm* — Squire Patton Boggs LLP; Sarah Mirza

(57) ABSTRACT

Various embodiments set forth systems and techniques for changing a face within an image. The techniques include receiving a first image including a face associated with a first facial identity; generating, via a machine learning model, at least a first texture map and a first position map based on the first image; rendering a second image including a face associated with a second facial identity based on the first texture map and the first position map, wherein the second facial identity is different from the first facial identity.

20 Claims, 7 Drawing Sheets

(51) Int. Cl.
    *G06N 3/045* (2023.01)
    *G06N 3/088* (2023.01)
    *G06T 11/00* (2006.01)

(52) U.S. Cl.
    CPC .... *G06T 17/20* (2013.01); *G06T 2207/20081* (2013.01); *G06T 2207/30201* (2013.01)

(58) Field of Classification Search
    CPC .......... G06T 17/20; G06T 2207/20081; G06T 2207/30201; G06T 11/00; G06T 19/20; G06T 2219/2021; G06V 10/774; G06V 10/82; G06V 20/647; G06V 40/161; G06V 40/172
    USPC .......................................................... 382/159
    See application file for complete search history.

(56) References Cited

U.S. PATENT DOCUMENTS

| | | | |
|---|---|---|---|
| 2019/0064927 A1* | 2/2019 | Tachi | G06F 3/01 |
| 2020/0151940 A1* | 5/2020 | Yu | G06V 40/168 |
| 2020/0234034 A1 | 7/2020 | Savchenkov et al. | |
| 2020/0368616 A1* | 11/2020 | Delamont | H04N 13/239 |
| 2021/0390789 A1* | 12/2021 | Liu | G06V 40/161 |

OTHER PUBLICATIONS

Bas et al., "3D Morphable Models as Spatial Transformer Networks", IEEE International Conference on Computer Vision Workshops, DOI 10.1109/ICCVW.2017.110, 2017, pp. 895-903.
Blanz et al., "Exchanging Faces in Images", Computer Graphics Forum, vol. 23, No. 3, https://doi.org/10.1111/.1467-8659.2004.00799.x, 2004, pp. 669-676.
Blanz et al., "A Morphable Model For The Synthesis Of 3D Faces", In Proceedings of the 26th Annual Conference on Computer Graphics and Interactive Technique, https://doi.org/10.1145/311535.311556, 1999, pp. 187-194.
Blanz et al., "Face Recognition Based on Fitting a 3D Morphable Model", IEEE Transactions on pattern analysis and machine intelligence, vol. 25, No. 9, Sep. 2003, pp. 1063-1074.
Burt et al., "A Multiresolution Spline With Application to Image Mosaics", ACM Transactions on Graphics, vol. 2, No. 4, Oct. 1983, pp. 217-236.
Cao et al., "FaceWarehouse: A 3D Facial Expression Database for Visual Computing", IEEE Transactions on Visualization and Computer Graphics, vol. 20, No. 3, DOI 10.1109/TVCG.2013.249, Mar. 2014, pp. 413-425.
Chen et al., "SimSwap: An Efficient Framework For High Fidelity Face Swapping", In Proceedings of the 28th ACM International Conference on Multimedia, https://doi.org/10.1145/3394171.3413630, Oct. 12-16, 2020, pp. 2003-2011.
Feng et al., "Learning an Animatable Detailed 3D Face Model from In-The-Wild Images", arXiv:2012.04012, Dec. 7, 2020, pp. 1-22.
Feng et al., "Joint 3D Face Reconstruction and Dense Alignment with Position Map Regression Network", ECCV, Computer Vision Foundation, 2018, pp. 1-18.
Goodfellow et al., "Generative Adversarial Nets", In Advances in Neural Information Processing Systems, 2014, pp. 2672-2680.
Gu et al., "Geometry Images", In Proceedings of the 29th Annual Conference on Computer Graphics and Interactive Techniques, https://doi.org/10.1145/566570.566589, 2002, pp. 355-361.
Guo et al., "3DDFA", Retrieved from https://github.com/cleardusk/3DDFA, on Oct. 6, 2021, 2018, 15 pages.
Guo et al., "Towards Fast, Accurate and Stable 3D Dense Face Alignment", In Proceedings of the European Conference on Computer Vision (ECCV), arXiv:2009.09960, 2020, 22 pages.
Karras et al., "Progressive Growing of GANs for Improved Quality, Stability, and Variation", ICLR, http://arxiv.org/ abs/1710.10196, Oct. 27, 2017, pp. 1-25.
Li et al., "Differentiable Monte Carlo Ray Tracing through Edge Sampling", ACM Trans. Graph., vol. 37, No. 6, Article 222, https://doi.org/10.1145/3272127.3275109, Nov. 2018, pp. 222:1-222:11.
Liu et al., "Unsupervised Image-to-Image Translation Networks", In Advances in Neural Information Processing Systems 30, 2017, pp. 700-708.
Naruniec et al., "High-Resolution Neural Face Swapping for Visual Effects", Computer Graphics Forum, vol. 39, No. 4, DOI: 10.1111/cgf.14062, 2020, pp. 173-184.
Nirkin et al., "FSGAN: Subject Agnostic Face Swapping and Reenactment", In Proceedings of the IEEE International Conference on Computer Vision, 2019, pp. 7184-7193.
Nirkin et al., "On Face Segmentation, Face Swapping, and Face Perception", 13th IEEE International Conference on Automatic Face & Gesture Recognition, DOI 10.1109/FG.2018.00024, 2018, pp. 98-105.
Paysan et al., "A 3D Face Model for Pose and Illumination Invariant Face Recognition", Advanced Video and Signal Based Surveillance, DOI 10.1109/AVSS.2009.58, 2009, pp. 296-301.
Petrov et al., "DeepFaceLab: Integrated, flexible and extensible face-swapping framework", Retrieved from https://github.com/iperov/DeepFaceLab, arXiv:2005.05535, 2020, pp. 1-10.
Wang et al., "Pixel2Mesh: Generating 3D Mesh Models from Single RGB Images", In ECCV, Computer Vision Foundation, 2018, 16 pages.
Wang et al., "Image Quality Assessment: From Error Visibility to Structural Similarity", IEEE Transactions on Image Processing, vol. 13, No. 4, DOI 10.1109/TIP.2003.819861, Apr. 2004, pp. 600-612.
Yu et al., "BiSeNet: Bilateral Segmentation Network for Real-Time Semantic Segmentation", In Proceedings of the European Conference on Computer Vision (ECCV), https://doi.org/10.1007/978-3-030-01261-8_20, 2018, pp. 334-349.
Zhu et al., "Face Alignment in Full Pose Range: A 3D Total Solution", IEEE Transactions on Pattern Analysis and Machine, DOI 10.1109/TPAMI.2017.2778152, 2017, 14 pages.
Jiang et al., "Disentangled Representation Learning for 3D Face Shape", Proceedings of the IEEE Conference on Computer Vision and Pattern Recognition, arXiv:1902.09887, Mar. 3, 2019, pp. 1-15.
Zhu et al., "High-Fidelity Pose and Expression Normalization for Face Recognition in the Wild", Proceedings of the IEEE Conference on Computer Vision and Pattern Recognition, 2015, pp. 787-796.
Abrevaya et al., "A Generative 3D Facial Model by Adversarial Training", 2019, 15 pages.
Abrevaya et al., "Multilinear Autoencoder for 3D Face Model Learning", IEEE Winter Conference on Applications of Computer Vision, DOI 10.1109/WACV.2018.00007, 2018, pp. 1-9.
Non-Final Office Action received for U.S. Appl. No. 16/809,495 dated Nov. 17, 2020, 26 pages.
Non-Final Office Action received for U.S. Appl. No. 16/809,495 dated Apr. 22, 2021, 17 pages.
Final Office Action received for U.S. Appl. No. 16/809,495 dated Aug. 11, 2021, 18 pages.

* cited by examiner

FACE SWAPPING WITH NEURAL NETWORK-BASED GEOMETRY REFINING

CROSS-REFERENCE TO RELATED APPLICATIONS

This application claims the priority benefit of United States provisional patent application titled, "FACE SWAPPING WITH NEURAL NETWORK-BASED GEOMETRY REFINING," filed on May 20, 2021, and having Ser. No. 63/191,246. The subject matter of this related application is hereby incorporated herein by reference.

BACKGROUND

Technical Field

Embodiments of the present disclosure relate generally to computer science and computer graphics and, more specifically, to face swapping with neural network-based geometry refining.

Description of the Related Art

Oftentimes, the facial identity of an individual needs to be changed in the frames of a video or in a standalone image while maintaining the performance of the individual within the video or image. As used herein, a "facial identity" refers to aspects of a facial appearance that arise from differences in personal identities, ages, lighting conditions, and the like. Thus, two different facial identities may be attributed to different individuals or to the same individual under different conditions, such as the same individual at different ages or under different lighting conditions. As used herein, the "performance" of an individual, which also is referred to as the dynamic "behavior" of an individual, includes the facial expressions and poses with which the individual appears in the frames of a video or in a standalone image.

One example scenario that requires the facial identity of an individual to be changed while maintaining the way the individual is performing is when the individual needs to be portrayed at a younger age in a particular scene within video content (e.g., a film, a show, etc.). As another example, an individual may be unavailable for a given video content production, and the face of that individual may need to be inserted into a particular scene within the video content to replace the face of another individual who was available for the video content production and performed in the particular scene.

Currently, there are few techniques for changing (i.e., replacing or modifying) facial identities in video frames and images that can produce photorealistic results. Some existing techniques utilize neural network models or three-dimensional (3D) morphable models to change facial identities in video frames and images. However, existing 3D morphable model techniques oftentimes rely on imperfect 3D geometry of faces, without being able to correct for such imperfections. As referred to herein, "perfect" 3D geometry refers to 3D geometric data that accurately represents the geometry of the face and head and can be used to provide ground truth information about the geometry of the face. For example, perfect 3D geometry can be obtained from, for instance, high-precision scans of a face and head. In contrast, "imperfect" 3D geometry refers to geometric data that does not accurately represent the geometry of the face and head and/or that contains errors or other imperfections. For example, imperfect 3D geometry can include geometric data obtained from images without using high-precision scans. The imperfect 3D geometry can produce unwanted artifacts that look unrealistic after facial identities are changed in video frames and images. Further, some existing neural network techniques do not account for the 3D geometry of faces. As a result, such techniques oftentimes produce unrealistic-looking facial changes in video frames and images where the faces being modified in order to implement the requisite facial identity changes are shown with profile views or other extreme poses.

Other existing neural network techniques that account for the 3D geometry of faces rely on 3D meshes that accurately represent the 3D geometry of faces, i.e., with perfect 3D geometry. Due to the errors and imperfections in the 3D meshes, however, such techniques produce unwanted artifacts. Further, creating a 3D mesh without imperfections requires using images captured using specialized equipment, e.g., a multi-view camera system. Such images may be difficult or impossible to obtain. For example, if the individual that appears in the video frames or images is no longer available or no longer looks the same, then obtaining images of the individual to create a 3D mesh without imperfections is impossible.

As the foregoing illustrates, what is needed in the art are more effective techniques for changing facial identifies in video frames and images.

SUMMARY

One embodiment of the present disclosure sets forth a computer-implemented method for changing a face within an image. The method includes receiving a first image including a face associated with a first facial identity. The method further includes generating, via a machine learning model, at least a first texture map and a first position map based on the first image. In addition, the method includes rendering a second image including a face associated with a second facial identity based on the first texture map and the first position map, wherein the second facial identity is different from the first facial identity.

At least one technical advantage of the disclosed techniques relative to the prior art is that the disclosed techniques can be effectively utilized to change (i.e., replace or modify) facial identities in video frames and images where perfect 3D meshes of the faces being modified are not available. In particular, the disclosed techniques enable realistic-looking facial changes to be made in the video frames and images, while reducing or eliminating the unwanted artifacts produced by conventional techniques when inaccurate or imperfect 3D meshes are used. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
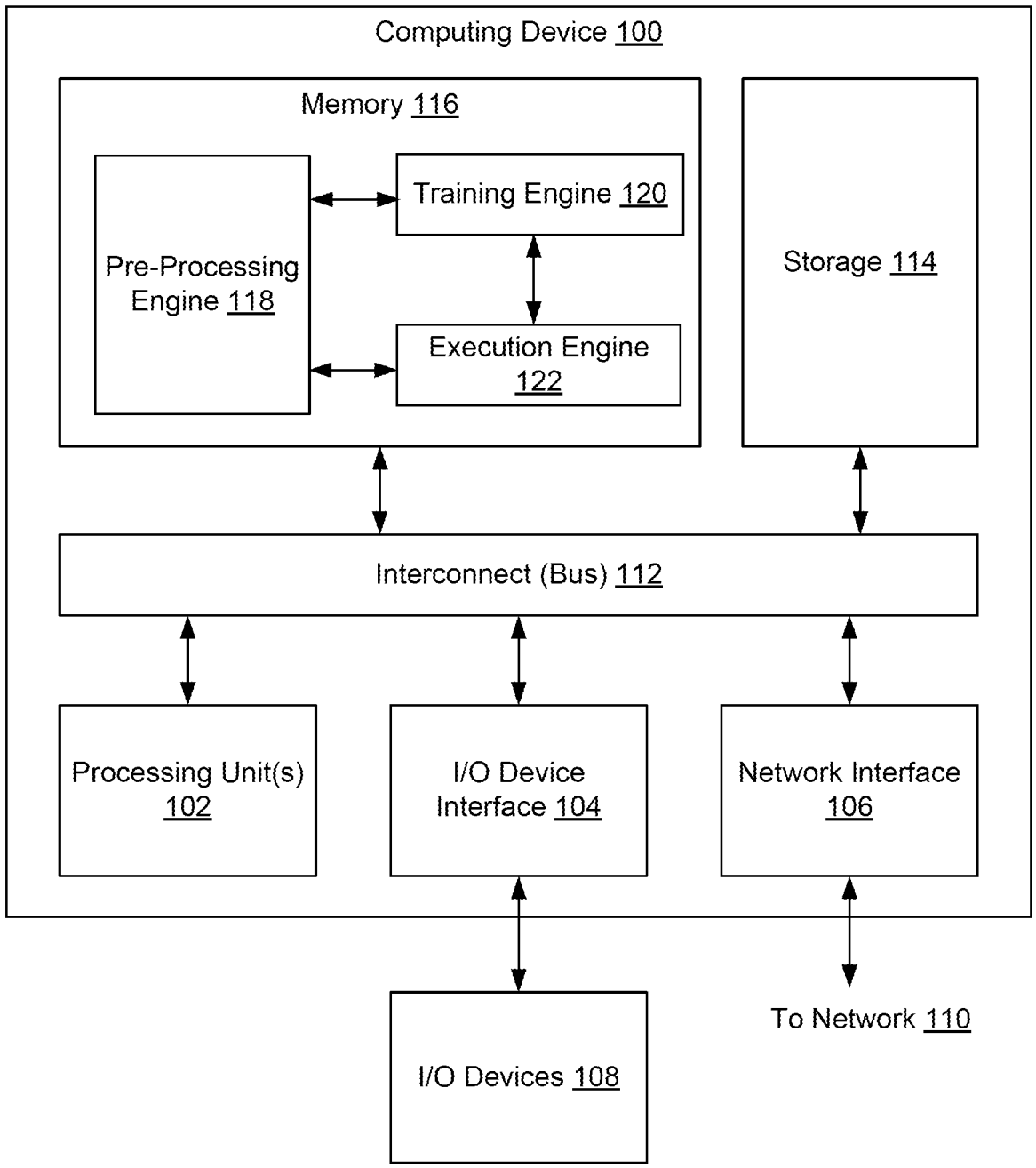
FIG. 1 illustrates a computing system configured to implement one or more aspects of the present disclosure.

FIG. 1 illustrates a computing device 100 configured to implement one or more aspects of the present disclosure. As shown, computing device 100 includes an interconnect (bus) 112 that connects one or more processing unit(s) 102, an input/output (I/O) device interface 104 coupled to one or more input/output (I/O) devices 108, memory 116, a storage 114, and a network interface 106 connected to a network 110.

Computing device 100 includes a server computer, a desktop computer, a laptop computer, a smart phone, a personal digital assistant (PDA), tablet computer, or any other type of computing device configured to receive input, process data, and optionally display images, and is suitable for practicing one or more embodiments. Computing device 100 described herein is illustrative and that any other technically feasible configurations fall within the scope of the present disclosure.

Processing unit(s) 102 includes any suitable processor implemented as a central processing unit (CPU), a graphics processing unit (GPU), an application-specific integrated circuit (ASIC), a field programmable gate array (FPGA), an artificial intelligence (AI) accelerator such as a tensor processing unit (TPU), any other type of processing unit, or a combination of different processing units, such as a CPU configured to operate in conjunction with a GPU. In general, processing unit(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing embodiment executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 includes any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Pre-processing engine 118, training engine 120, and/or execution engine 122 may be stored in storage 114 and loaded into memory 116 when executed.

Memory 116 includes a random-access memory (RAM) module, a flash memory unit, or any other type of memory unit or combination thereof. Processing unit(s) 102, I/O device interface 104, and network interface 106 are configured to read data from and write data to memory 116. Memory 116 includes various software programs that can be executed by processing unit(s) 102 and application data associated with said software programs, including pre-processing engine 118, training engine 120, and execution engine 122. Pre-processing engine 118, training engine 120, and execution engine 122 are described in further detail below with respect to FIGS. 2-4, respectively.

It will be appreciated that the system shown herein is illustrative and that variations and modifications are possible. Although FIG. 1 illustrates pre-processing engine 118, training engine 120, and execution engine 122 executing on the same computing device 100, one or more of pre-processing engine 118, training engine 120, and execution engine 122, or any combination thereof, may execute on different computing devices. Further, the functionality included in any of pre-processing engine 118, training engine 120, or execution engine 122 may be divided across any number of applications or other software that are stored and execute via any number of devices that are located in any number of physical locations. For example, training engine 120 may be included in an application that trains machine learning models, while execution engine 122 is included in a different application for changing facial identities appearing in frames of a video or in standalone images. Each application can execute on a different computing device. Further, each application can include a separate instance of pre-processing engine 118 and/or can receive data generated by an instance of pre-processing engine 118 separate from the application.

Figure 2:
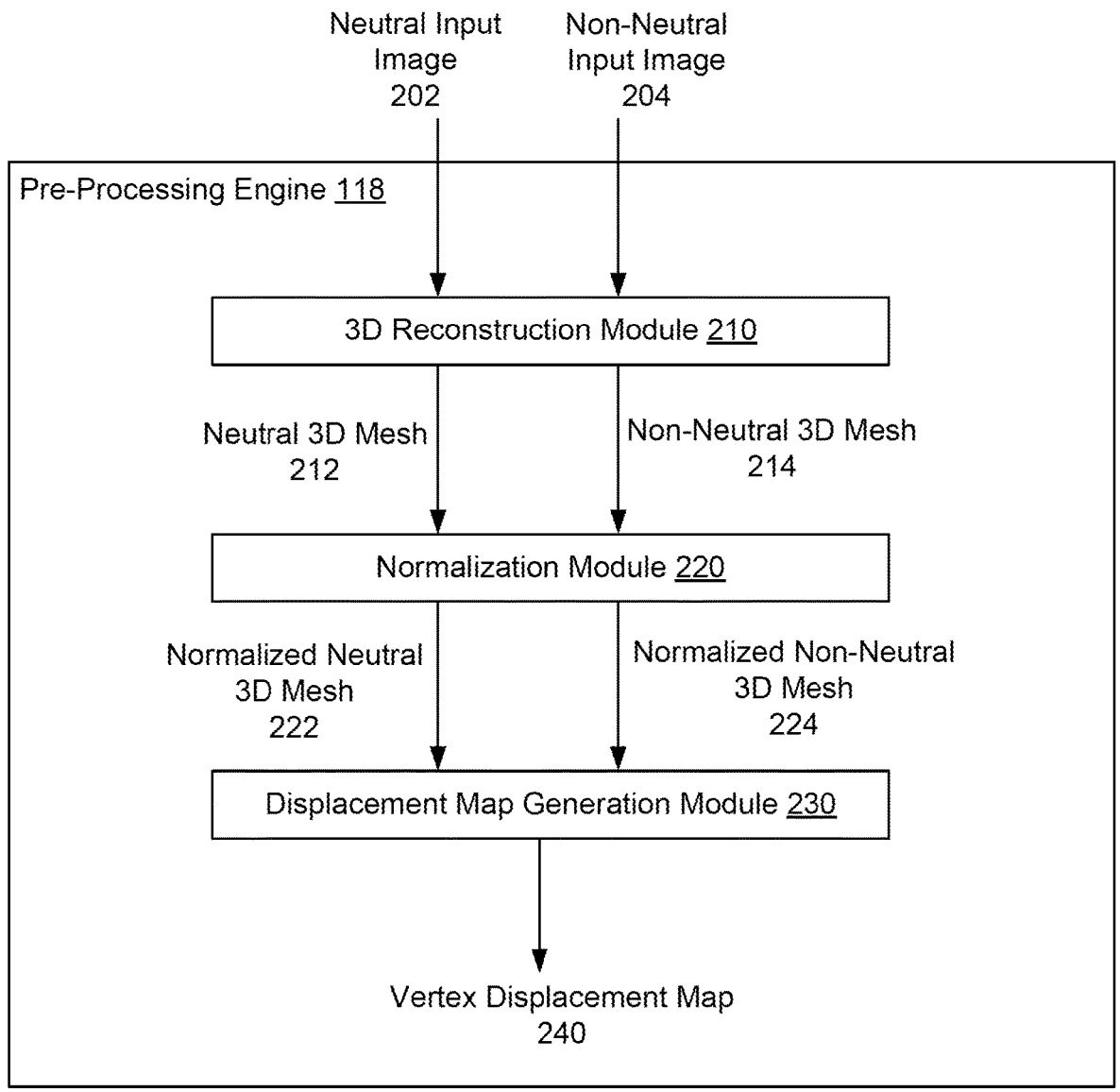
FIG. 2 is a more detailed illustration of the pre-processing engine of FIG. 1, according to various embodiments.

FIG. 2 is a more detailed illustration of the pre-processing engine 118 of FIG. 1, according to various embodiments. As shown in FIG. 2, pre-processing engine 118 includes, without limitation, 3D reconstruction module 210, normalization module 220, and displacement map generation module 230.

Pre-processing engine receives a neutral input image 202 and a non-neutral input image 204. The neutral input image 202 depicts a face without any facial expressions, i.e., having a neutral expression. The non-neutral input image 204 depicts the same face with a facial expression, i.e., having a non-neutral expression. In some embodiments, the neutral input image 202 and the non-neutral input image 204 depict the face from the same, or similar, distance and/or angle. Additionally, the neutral input image 202 and the non-neutral input image 204 may also be captured under the same or similar lighting conditions. In some embodiments, the neutral input image 202 and the non-neutral input image 204 depict the face in substantially the same pose, such as the angle of the face from the camera, the tilt of the head, the position of the head relative to the rest of the body, and so forth.

Pre-processing engine 118 processes the input images (i.e., neutral input image 202 and non-neutral input image 204) to generate a vertex displacement map 240. The vertex displacement map 240 is a 2D position map representing differences between a 3D mesh of the face with the neutral expression and a 3D mesh of the face with the non-neutral expression.

In operation, 3D reconstruction module 210 generates a neutral 3D mesh 212 based on neutral input image 202 and a non-neutral 3D mesh 214 based on non-neutral input image 204. In some embodiments, 3D reconstruction module 210 applies one or more 3D reconstruction algorithms to neutral input image 202 and non-neutral input image 204 to generate neutral 3D mesh 212 and non-neutral 3D mesh 214, respectively. Any technically feasible 3D reconstruction algorithm may be used, such as 3DDFA (3D Dense Face Alignment). Neutral 3D mesh 212 is a 3D representation of the face, or the portion thereof, depicted in neutral input image 202. Non-neutral 3D mesh 214 is a 3D representation of the face, or the portion thereof, depicted in non-neutral input image 204, including the facial expression on the face. In some cases, the neutral input image 202 and/or the non-neutral input image 204 may be a low-resolution and/or low-quality image. The neutral 3D mesh 212 and the non-neutral 3D mesh 214 may, therefore, include geometric imperfections and/or include fewer details compared to 3D meshes generated from images captured by high resolution and/or multi-view camera systems.

Additionally, in some embodiments, 3D reconstruction module 210 generates a UV map corresponding to the neutral 3D mesh 212 and non-neutral 3D mesh 214. The UV map indicates correspondences between points in 3D space and points in a 2D image. Specifically, the UV map assigns, for each vertex or node of a 3D mesh (e.g., neutral 3D mesh 212 and non-neutral 3D mesh 214), a unique (u,v) coordinate that can be used to look up a values from the corresponding location in a 2D image, such as colors from an RGB texture image or replacement vertex positions from a position map that encodes XYZ vertex positions.

Normalization module 220 receives the neutral 3D mesh 212 and non-neutral 3D mesh 214 and generates a normalized neutral 3D mesh 222 and a normalized non-neutral 3D mesh 224. As used herein, normalizing a 3D mesh refers to centering the 3D mesh and removing any motion or pose from the geometry. Normalizing the 3D mesh includes one or more of scaling the 3D mesh, rotating the 3D mesh, or translating the 3D mesh. For example, if a face depicted in an input image is tilted slightly away from the camera, then the corresponding 3D mesh is also slightly tilted. Normalization module 220 rotates the 3D mesh to remove the tilt. Additionally, normalization module 220 moves the 3D mesh so that the 3D mesh is centered in the 3D space. Accordingly, normalization module 220 also generates an amount of rotation and an amount of translation (not shown), corresponding to the amount of rotation and translation, respectively, applied to the 3D mesh in order to generate a normalized 3D mesh. In some embodiments, the same amount of rotation and/or the same amount of translation is applied to both the neutral 3D mesh 212 and the non-neutral 3D mesh 214. In some embodiments, normalization module 220 stores the amount of scaling, rotation, and/or translation applied to the 3D mesh. As discussed in further detail below, the amount of scaling, rotation, and/or translation applied to the 3D mesh is used to remove the scaling, rotation, and/or translation from a 3D mesh with a swapped facial identity.

In some embodiments, rather than generating and normalizing the neutral 3D mesh 212 and non-neutral 3D mesh 214, pre-processing engine 118 normalizes the input images (e.g., neutral input image 202 and non-neutral input image 204) and generates normalized 3D meshes based on the normalized images. Normalization module 220 receives neutral input image 202 and non-neutral input image 204 and generates a normalized neutral image and a normalized non-neutral input image. Generating a normalized image includes, for example, scaling, rotating, and/or translating the input image. In some embodiments, normalizing the input images include aligning the input images such that landmarks on the face depicted in the input images match landmarks of a generic face with a neutral expression, e.g., such that facial features such as the eyes, nose, etc. within the input images are at similar locations. Additionally, each input image could be scaled and/or cropped to a particular size, such as 1024 pixels by 1024 pixels. 3D reconstruction module 210 then generates normalized neutral 3D mesh 222 and normalized non-neutral 3D mesh 224 (instead of neutral 3D mesh 212 and non-neutral 3D mesh 214) based on the normalized neutral input image and normalized non-neutral input image, respectively.

Displacement map generation module 230 receives the normalized neutral 3D mesh 222 and the normalized non-neutral 3D mesh 224 and generates a vertex displacement map 240. The vertex displacement map 240 is a 2D position map that represents differences between the vertices of the normalized neutral 3D mesh 222 and the normalized non-neutral 3D mesh 224.

In some embodiments, generating the vertex displacement map 240 includes subtracting the normalized neutral 3D mesh 222 from the normalized non-neutral 3D mesh 224 to generate a set of vertex displacement values corresponding to differences between the vertices of the normalized non-neutral 3D mesh 224 and the vertices of the normalized neutral 3D mesh 222. The set of vertex displacement values represents the 3D displacement that is applied to the neutral facial expression to form the non-neutral facial expression. Each vertex displacement value corresponds to a location within the 3D space. To generate the vertex displacement map 240, displacement map generation module 230 maps each vertex displacement value into 2D space. As an example, displacement map generation module 230 can map the 3D coordinate location of each vertex displacement value to a corresponding UV coordinate location.

As discussed in further detail below in FIGS. 3 and 4, the vertex displacement map 240 is provided to training engine 120 as training data and/or to execution engine 122 for generating an image with a swapped facial identity. In some embodiments, the amount of rotation, the amount of translation, and/or the amount of scaling are also provided to training engine 120 and/or execution engine 122. In some embodiments, the non-neutral 3D mesh 214 is provided to training engine 120 for computing losses between the non-neutral 3D mesh 214 and a 3D mesh generated by the training engine 120.

In some embodiments, pre-processing engine 118 transmits one or more of the vertex displacement map 240, amount of scaling, amount of rotation, amount of translation, the neutral 3D mesh 212, the normalized neutral 3D mesh 222, the non-neutral 3D mesh 214, the normalized non-neutral 3D mesh 224, or the UV map to training engine 120 and/or execution engine 122. In some embodiments, pre-processing engine 118 stores one or more of the vertex displacement map 240, amount of scaling, amount of rotation, amount of translation, the neutral 3D mesh 212, the normalized neutral 3D mesh 222, the non-neutral 3D mesh 214, the normalized non-neutral 3D mesh 224, or the UV map, for example, to storage 114 or in memory 116 for later use.

Figure 3:
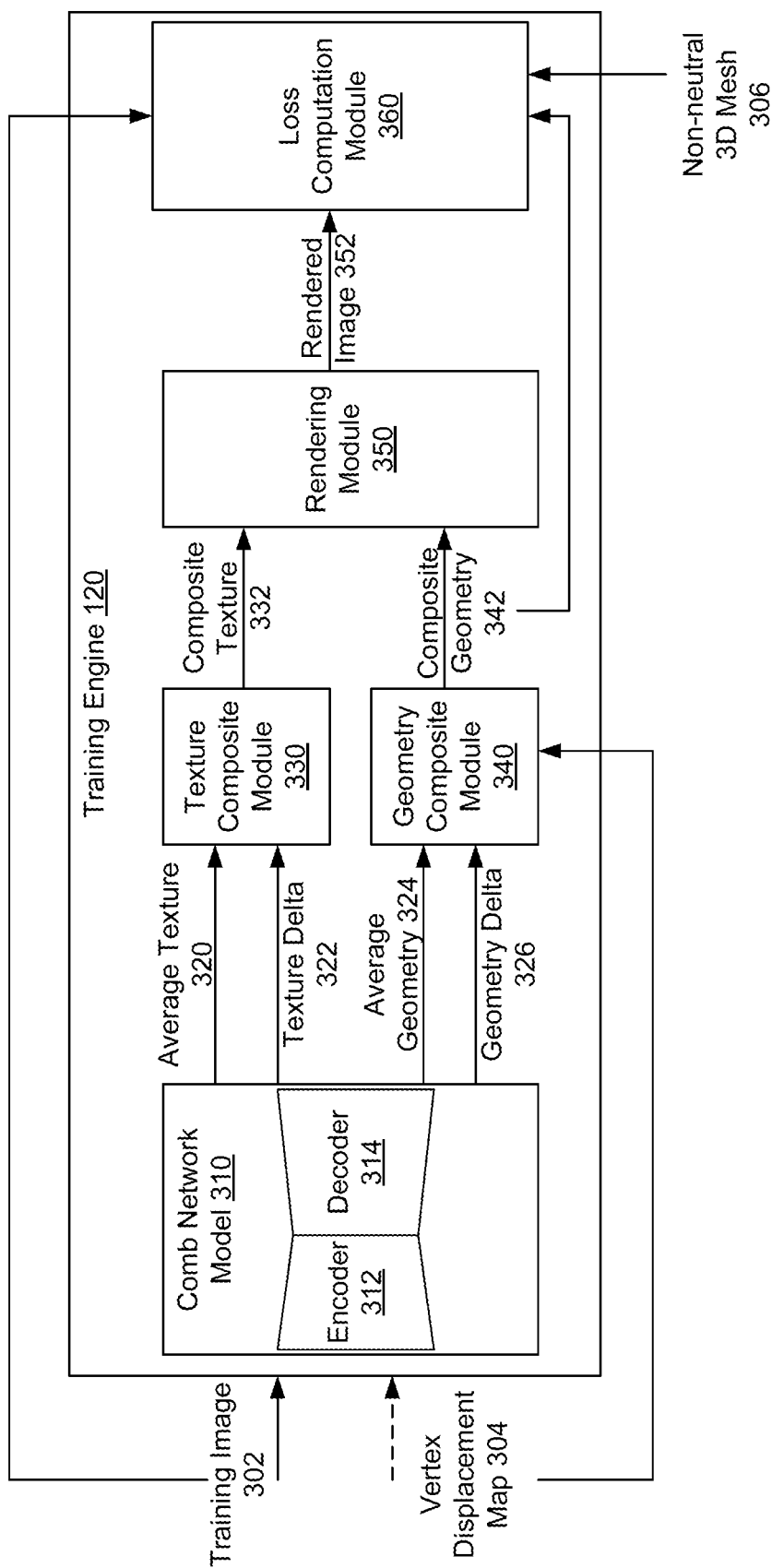
FIG. 3 is a more detailed illustration of the training engine of FIG. 1, according to various embodiments.

FIG. 3 is a more detailed illustration of the training engine 120 of FIG. 1, according to various embodiments. Training engine 120 trains a comb network model that can be used to change the identities of faces depicted in video frames and images. As shown in FIG. 3, training engine 120 includes, without limitation, a comb network model 310, texture composite module 330, geometry composite module 340, rendering module 350, and loss computation module 360.

Training engine 120 receives a set of training data for training the comb network model 310. In some embodiments, the set of training data comprises a set of training images, including training image 302. Each training image is a normalized image that depicts a face of a person. As used herein, normalizing an image refers to aligning the image such that landmarks on a face depicted in the image match landmarks of a generic face with a neutral expression. As a result, facial features such as the eyes, nose, etc. are at similar locations within the normalized images. An image can be normalized in any technically-feasible manner, including using face alignment techniques to compute an affine transformation that rotates, scales, translates, etc. the image, and/or cropping the image. For example, an image can be rotated and scaled so that the eyes of the face lie on a predefined horizontal line and have a predefined ocular distance. Additionally, the image can be cropped to a predefined image size.

Optionally, in some embodiments, the set of training data also comprises, for each training image, a vertex displacement map corresponding to the training image. The vertex displacement map is generated in a manner similar to that discussed above with respect to vertex displacement map 240 and pre-processing engine 118. For example, assume training image 302 depicts a face of a person with a facial expression. That is, training image 302 depicts a face with a non-neutral expression. Pre-processing engine 118 generates vertex displacement map 304 based on training image 302 and an image depicting the same person with a neutral facial expression.

As shown, comb network model 310 comprises an encoder 312 and decoder 314. Encoder 312 is trained to perform one or more encoding operations on training image 302 to generate an encoded representation of training image 302. Additionally, in some embodiments, encoder 312 is trained to perform one or more encoding operations on a corresponding vertex displacement map 304 to generate an encoded representation of the vertex displacement map 304. Decoder 314 is trained to convert the encoded representation of training image 302 and, optionally, the encoded representation of the vertex displacement map 304, into one or more outputs of the comb network model 310.

In some embodiments, each training image in the set of training images, including training image 302 is associated with a specific facial identity. Decoder 314 is trained to generate one or more output images corresponding to the specific facial identity. In some embodiments, a trained comb network model 310 can include any number of decoders that each are associated with a different facial identity. In particular, the training data can include different sets of training images that are associated with different facial identities. Training engine 120 trains, based on each set of training images, a corresponding decoder that is associated with the facial identity corresponding to the set of training images. In contrast, the same encoder 312 is trained for all of the different facial identities, and the trained encoder 312 can be used to encode input data corresponding to facial identities that are not included in the training data.

As shown in FIG. 3, decoder 314 is trained to generate an average texture 320, a texture delta 322, an average geometry 324, and a geometry delta 326. In some embodiments, decoder 314 is trained to generate and/or use the same average texture 320 and the same average geometry 324 for any given input image. The average texture 320 and average geometry 324 correspond to the specific facial identity that is associated with decoder 314. The average texture 320 is a 2D texture that represents an average texture map for the face corresponding to the specific facial identity. The average geometry 324 is a 2D position map that represents the average geometry of the face corresponding to the specific facial identity. The texture delta 322 and geometry delta 326 represent adjustments to the average texture 320 and average geometry 324, respectively, based on the specific input image. Training decoder 314 to generate and/or use the average texture 320 and average geometry 324 for the specific facial identity reduces the computational load on the trained decoder 314, as at least a subset of the features that are included in the average texture 320 and average geometry 324 do not vary significantly after training.

In some embodiments, training engine 120 is configured to receive and/or store the average texture 320 and the average geometry 324. The average texture 320 and/or the average geometry 324 are generated based on a neutral image of a face corresponding to the specific facial identity, for example, by pre-processing engine 118 based on neutral input image 202. In some embodiments, the normalized neutral 3D mesh 222 is used as the average geometry 324 for the specific facial identity.

As shown in FIG. 3, comb network model 310 receives training image 302 and vertex displacement map 304, and generates average texture 320, texture delta 322, average geometry 324, and geometry delta 326 based on the training image 302 and the vertex displacement map 304. The number and types of outputs of decoder 314, and therefore the comb network model 310, may be modified as desired. For example, rather than generating an average texture 320 and a texture delta 322, decoder 314 can be trained to generate a single 2D texture based on an input image. In such cases, decoder 314 could transmit the composite texture to rendering module 350 instead of to texture composite module 330. As another example, rather than generating an average geometry 324 and a geometry delta 326, decoder 314 can be trained to generate a single 2D position map based on the input image. Geometry composite module 340 could receive the single 2D position map and generate a composite geometry 342, in a manner similar to that described below.

Texture composite module 330 receives the average texture 320 and the texture delta 322 and generates a composite texture 332. The composite texture 332 is a 2D texture that represents a texture of the face depicted in the training image 302. In some embodiments, texture composite module 330 combines the average texture 320 and texture delta 322 to generate the composite texture 332. Combining the average texture 320 and texture delta 322 includes, for each pixel of the average texture 320, modifying the pixel value based on a corresponding pixel in the texture delta 322. The modified pixel value is used as the value of the corresponding pixel in composite texture 332.

Geometry composite module 340 receives the average geometry 324 and the geometry delta 326 and generates composite geometry 342. The composite geometry 342 is a 3D mesh that represents a geometry of the face depicted in the training image 302. In some embodiments, generating composite geometry 342 includes combining average geometry 324 and geometry delta 326 to generate a combined position map. The combined position map is a 2D position map that represents the facial geometry of the face depicted in training image 302. In some embodiments, combining the average geometry 324 and geometry delta 326 includes, for each pixel of average geometry 324, modifying the pixel value based on a corresponding pixel in geometry delta 326. The modified pixel value is used as the value of the corresponding pixel in the combined position map.

In some embodiments, geometry composite module 340 also receives a vertex displacement map 304. Geometry composite module 340 modifies the combined position map based on the vertex displacement map 304. As discussed above, the vertex displacement map represents the 3D displacement that is applied to a neutral facial expression to form a specified non-neutral facial expression. Modifying the combined position map based on the vertex displacement map 304 applies the non-neutral facial expression to the face represented by the combined position map. In some embodiments, modifying the combined position map based on the vertex displacement map 304 includes, for each pixel of the combined position map, modifying the pixel value based on a corresponding pixel in the vertex displacement map 304.

Geometry composite module 340 generates composite geometry 342 based on the combined position map. In some embodiments, geometry composite module 340 maps each pixel of the combined position map into 3D space. Geometry composite module 340 performs bilinear interpolation of the combined position map with a UV map to generate the composite geometry 342. As discussed above, the UV map indicates correspondences between 2D points in the combined position map and points in 3D space. In some embodiments, the UV map corresponds to a 3D mesh of training image 302 and is generated when pre-processing engine 118 processes the training image 302 to generate a 3D mesh.

In some embodiments, geometry composite module 340 also receives an amount of rotation and an amount of translation (not shown) generated by pre-processing engine 118 when generating vertex displacement map 304. The amount of rotation corresponds to an amount of rotation applied by pre-processing engine 118 when normalizing the 3D meshes used to generate vertex displacement map 304. The amount of translation corresponds to the amount of translation applied by pre-processing engine 118 when normalizing the 3D meshes used to generate the vertex displacement map 304. Geometry composite module 340 adjusts the rotation and translation of the composite geometry 342 based on the amount of rotation and the amount of translation. In some embodiments, geometry composite module 340 removes the rotation and/or translation applied by pre-processing engine 118. That is, the composite geometry 342 generated based on the combined position map is a normalized 3D mesh, and adjusting the rotation and/or translation of the composite geometry 342 adds the motion or pose depicted in the original, non-normalized version of training image 302 back to the normalized 3D mesh.

Rendering module 350 receives the composite texture 332 and composite geometry 342, and applies the composite texture 332 to composite geometry 342. Rendering module 350 renders the resulting combination to generate a rendered image 352. Rendered image 352 is a 2D image that depicts the face generated using comb network model 310 based on training image 302. Rendered image 352 has the same facial identity as training image 302. That is, the face depicted in rendered image 352 is the same face that is depicted in training image 302. Rendering module 350 may render the image 352 using any technically-feasible rendering technique.

Loss computation module 360 computes one or more losses used by training engine 120 to train the comb network model 310. Training engine 120 trains comb network model 310, which includes training the average texture and average geometry, to minimize each of the one or more losses. In some embodiments, the one or more losses include a reconstruction loss, a silhouette loss, and a smoothing loss.

A reconstruction loss represents a difference between the training input image 302 and the rendered image 352. In some embodiments, computing the reconstruction loss includes masking the background of the training input image 302 and the rendered image 352. For example, a face segmentation mask could be applied to each of training input image 302 and rendered image 352. An example function for computing a reconstruction loss based on a training input image and a rendered image is given by equation (1):

$$L_{rec} = d(x_p \odot M(x_p), \hat{x}_{p \leftarrow p} \odot M(x_p))  \quad (1)$$

As shown in equation (1), $x_p$ represents the training input image, $\hat{x}_{p \leftarrow p}$ represents the rendered image generated by training engine 120, $M(x_p)$ represents the face segmentation mask for the training input image, $d(\ )$ represents a multi-scale structural similarity (MS-SSIM) index, and $\odot$ represents the Hadamard product. Accordingly, equation (1) computes a reconstruction loss between the training input image and the rendered image based on applying a face segmentation mask for the training input image to both the training input image and the rendered image.

A silhouette loss represents a difference between the silhouette of the composite geometry 342 and a silhouette of the face depicted in the training input image 302. In some embodiments, loss computation module 360 extracts the silhouette of the face depicted in the training image 302 using one or more image segmentation techniques. An example function for computing a silhouette loss based on a training input image and a composite geometry is given by equation (2):

$$L_{silhouette} = \|M(x_p) - S(G'_{p \leftarrow p})\|_1  \quad (2)$$

As shown in equation (2), $M(x_p)$ represents the face segmentation mask (silhouette) of the training input image, and $S(G'_{p \leftarrow p})$ represents the silhouette of the composite geometry generated by training engine 120. Accordingly, equation (2) computes a $L_1$-loss between the face segmentation mask for the training input image and the silhouette of the composite geometry. Training the decoder 314 based on the silhouette loss constrains the geometry generated by training engine 120 to the shape boundaries of the training input.

A smoothing loss represents a difference between the composite geometry 342 and a non-neutral 3D mesh 306 corresponding to the training input image 302. The non-neutral 3D mesh 306 is generated by pre-processing engine 118 based on the training image 302. Example functions for computing a smoothing loss based on a 3D mesh of the training input image and a composite geometry is given by equations (3a) and (3b):

$$\delta_v = v - \frac{1}{\|N(v)\|} \sum\nolimits_{k \in N(v)} k \quad (3a)$$

$$L_{smoothing} = \|\delta_{vinput} - \delta_{vlearned}\|_2^2 \quad (3b)$$

As shown in equation (3a), $\delta_v$ represents the Laplacian coordinate for each vertex v of a 3D mesh, such as the composite geometry 342 or the non-neutral 3D mesh 306, and N(v) represents the set of neighbors of the vertex v. Training the decoder 314 based on smoothing loss reduces the amount of uneven vertices within a silhouette. The vertices of the 3D mesh generated by training engine 120 are constrained to remain at similar positions relative to the positions of their neighboring vertices. If the vertices in the 3D mesh move, the vertices have to deform smoothly together and preserve the shape in order to minimize the smoothing loss. Accordingly, the vertices of the 3D mesh are encouraged to move in the same direction as its neighbors and the movements are constrained to be smooth compared to the non-neural 3D mesh.

In some embodiments, loss computation module 360 computes a total loss based on two or more of the reconstruction loss, silhouette loss, and smoothing loss. Additionally, in some embodiments, loss computation module 360 computes the total loss based on texture delta 322 and/or geometry delta 326. The deltas capture the dynamic frame-specific information such as the expression, lighting and gaze direction. For training purposes, the texture delta 322 and/or the geometry delta 326 should be close to zero, to avoid the training engine 120 learning static information. Example functions for computing losses based on a texture delta and a geometry delta are given in equations (4a) and (4b):

$$L_{texture} = \|\Delta T_{p \leftarrow p}\|_2^2 \quad (4a)$$

$$L_{geometry} = \|\Delta G_{p \leftarrow p} - D_p\|_2^2 \quad (4a)$$

As shown in figures (4a) and (4b), $\Delta T_{p \leftarrow p}$ represents the texture delta 322, $\Delta G_{p \leftarrow p}$ represents the geometry delta 326, and $D_p$ represents the differences between the neutral expression of the facial identity and the expression in the training input image, i.e., the vertex displacement map 304.

An example function for computing a total loss based on a reconstruction loss, silhouette loss, smoothing loss, texture delta, and geometry delta is given in equation (5):

$$L_{total} = \lambda L_{rec} + \lambda L_{silhouette} + \lambda L_{smoothing} + \lambda L_{texture} + \lambda L_{geometry} \quad (5)$$

As shown in equation (5), $L_{rec}$ refers to the reconstruction loss, $L_{silhouette}$ refers to the silhouette loss, $L_{smoothing}$ refers to the smoothing loss, $L_{texture}$ refers to the texture loss, $L_{geometry}$ refers to the geometry loss, and A represents a weight associated with each loss. The weight associated with each could be different and/or some losses could not be associated with a weight.

Although examples are described herein primarily with respect to comb network models, embodiments may use any technically-feasible machine learning model, such as other types of image-to-image translation neural networks. In particular, any machine learning model that can generate identity-specific output can be used. For example, an AdaIN (adaptive instance normalization) model can be used. Instead of a plurality of decoders that each correspond to different facial identities, the AdaIN model includes a single decoder that comprises different sets of layers. Each set of layers corresponds to a different facial identity. Accordingly, the AdaIN model trains a decoder that uses different weights for different facial identities. Training the AdaIN model, or any other machine learning model that can generate identity-specific output, is performed in a manner similar to that described above with respect to the comb network model 310.

Training data and/or trained machine learning modes, including comb network model 310, may be stored, for example in storage 114, and deployed to any suitable application(s), such as execution engine 122.

Figure 4:
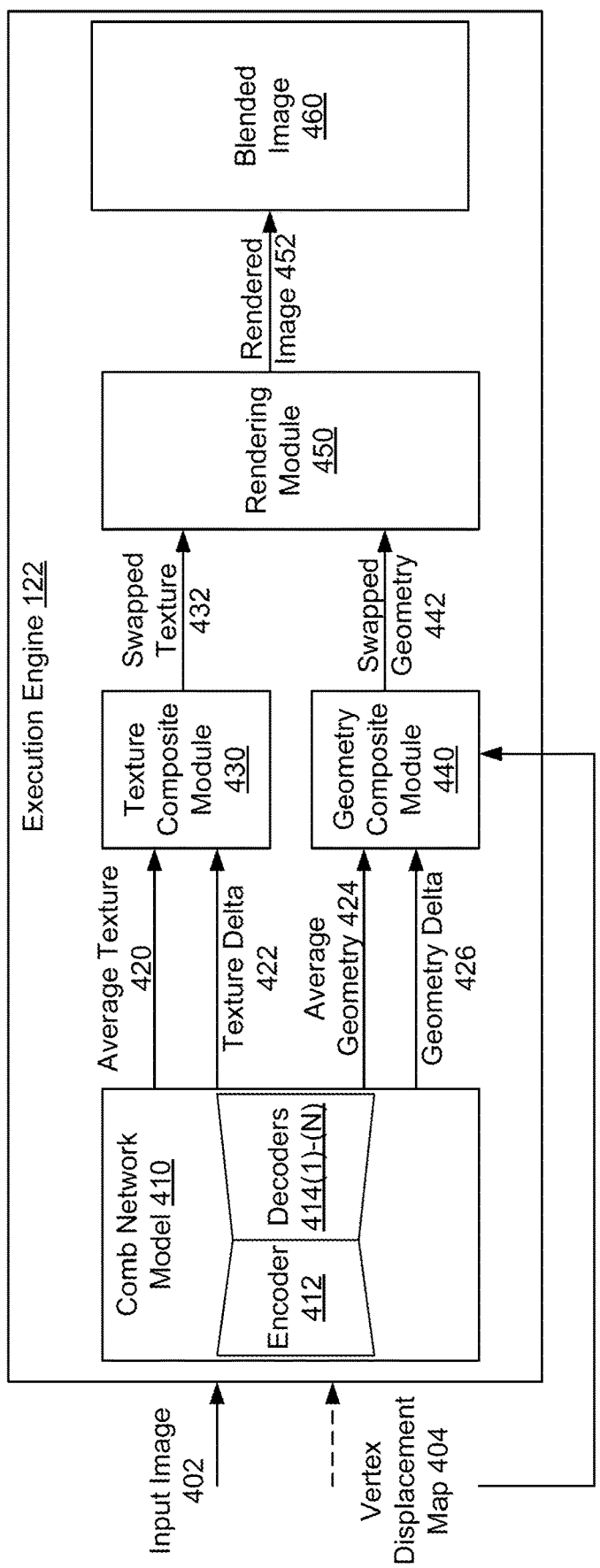
FIG. 4 is a more detailed illustration of the execution engine of FIG. 1, according to various embodiments.

FIG. 4 is a more detailed illustration of the execution engine 122 of FIG. 1, according to various embodiments. Execution engine 122 includes functionality to execute the comb network model 310 trained by training engine 120 to change the facial identity appearing in an image. As shown, execution engine 122 includes comb network model 410, texture composite module 430, geometry composite module 440, and rendering module 450.

Execution engine 122 receives an input image 402. Input image 402 is a normalized image that depicts a face of a person. Input image 402 is associated with a specific facial identity. Input image 402 may be, for example, a frame of a video or a standalone image. In some embodiments, execution engine 122 receives a non-normalized image as input and normalizes the image to generate input image 402. Execution engine 122 can use any normalization technique to normalize the image, such as those discussed above with respect to FIG. 3, or any other normalization techniques known in the art.

In some embodiments, execution engine 122 also receives a vertex displacement map 404 corresponding to the input image 402. The vertex displacement map 404 is generated in a manner similar to that discussed above with respect to vertex displacement map 240 and pre-processing engine 118.

Execution engine 122 inputs the input image 402 and, optionally, the vertex displacement map 404 into comb network model 410. Comb network model 410 corresponds to the comb network model 310 described above in conjunction with FIG. 3. Comb network model 410 is trained to receive an input image and generate one or more corresponding output images. As shown in FIG. 4, comb network model 410 receives input image 402 and vertex displacement map 404 and generates an average texture 420, a texture delta 422, an average geometry 424, and a geometry delta 426.

Comb network model 410 includes an encoder 412 and a plurality of decoders 414(1)-(N). The encoder 412 encodes the input image 402 into an encoded representation of the input image 402. Additionally, in some embodiments, the encoder 412 encodes the vertex displacement map 404 into an encoded representation of the vertex displacement map 404.

Each decoder 414 is associated with a different facial identity. During training, each decoder 414 is trained using images corresponding to a different facial identity. After training, each decoder 414 is used to obtain outputs that correspond to the associated facial identity. Based on a target facial identity, the decoder 414 associated with the target facial identity is used to obtain an average texture 420, a texture delta 422, an average geometry 424, and a geometry delta 426 corresponding to the target facial identity. In some embodiments, a user selects the target facial identity from a plurality of facial identities. In some embodiments, a user selects a specific decoder 414 to use. The selected decoder 414 is used to obtain the average texture 420, texture delta 422, average geometry 424, and geometry delta 426 corresponding to the facial identity associated with the selected decoder 414. In some embodiments, comb network model 410 receives and/or retrieves the average texture 420 and/or the average geometry 424 corresponding to the facial identity.

Texture composite module 430 receives the average texture 420 and texture delta 422 and generates a swapped texture 432. The swapped texture 432 is a 2D texture that represents a texture of a face corresponding to the target facial identity. In some embodiments, texture composite module 430 combines the average texture 420 and texture delta 422 to generate the swapped texture 432. Combining the average texture 420 and texture delta 422 includes, for each pixel of the average texture 420, modifying the pixel value based on a corresponding pixel in the texture delta 422. The modified pixel value is used as the value of the corresponding pixel in swapped texture 432.

Geometry composite module 440 receives the average geometry 424 and the geometry delta 426 and generates swapped geometry 442. The swapped geometry 442 is a 3D mesh that represents a geometry of the face corresponding to the target facial identity. In some embodiments, generating swapped geometry 442 includes combining average geometry 424 and geometry delta 426 to generate a combined position map. The combined position map is a 2D position map that represents the facial geometry of the face corresponding to the target facial identity. In some embodiments, combining the average geometry 424 and geometry delta 426 includes, for each pixel of average geometry 424, modifying the pixel value based on a corresponding pixel in geometry delta 426. The modified pixel value is used as the value of the corresponding pixel in the combined position map.

In some embodiments, geometry composite module 440 also receives a vertex displacement map 404. Geometry composite module 440 modifies the combined position map based on the vertex displacement map 404. As discussed above, the vertex displacement map represents the 3D displacement that is applied to a neutral facial expression to form a specified non-neutral facial expression. Modifying the combined position map based on the vertex displacement map 404 applies the non-neutral facial expression to the face represented by the combined position map. In some embodiments, modifying the combined position map based on the vertex displacement map 404 includes, for each pixel of the combined position map, modifying the pixel value based on a corresponding pixel in the vertex displacement map 404.

Geometry composite module 440 generates swapped geometry 442 based on the combined position map. In some embodiments, geometry composite module 440 maps each pixel of the combined position map into 3D space. Geometry composite module 440 performs bilinear interpolation of the combined position map with a UV map to generate the swapped geometry 442. As discussed above, the UV map indicates correspondences between 2D points in the combined position map and points in 3D space. In some embodiments, the UV map corresponds to a 3D mesh of input image 402 and is generated when pre-processing engine 118 processes the input image 402 to generate a 3D mesh.

In some embodiments, geometry composite module 440 also receives an amount of rotation and an amount of translation (not shown) generated by pre-processing engine 118 when generating vertex displacement map 404. The amount of rotation and the amount of translation corresponds to an amount of rotation and an amount of translation applied by pre-processing engine 118 when normalizing the 3D meshes used to generate vertex displacement map 404, respectively. Geometry composite module 440 adjusts the rotation and translation of the swapped geometry 442 based on the amount of rotation and the amount of translation. After adjusting the rotation and translation, the swapped geometry 442 includes the motion or pose depicted in the original, non-normalized version of input image 402.

Rendering module 450 receives the swapped texture 432 and swapped geometry 442 and applies the swapped texture 432 to swapped geometry 442. Rendering module 450 renders the resulting combination to generate a rendered image 452. Rendered image 452 is a 2D image that depicts the face generated using comb network model 410 based on input image 402. The face depicted in rendered image 452 is the face depicted in input image 402 with the facial identity changed to the facial identity associated with the selected decoder 414 (i.e., the target facial identity). Rendering module 450 may render the image 452 using any technically-feasible rendering technique.

In some embodiments, rendering module 450 blends the rendered image 452 with input image 402 to generate a blended image 460. The blended image 460 includes the face depicted in rendered image 452 and the non-facial regions depicted in input image 402, such as hair, body, clothing, background elements, and so forth. In some embodiments, blending the rendered image 452 with input image 402 includes performing one or more image segmentation operations on input image 402 to identify the face depicted in input image 402 and one or more non-facial regions depicted in input image 402. The face depicted in input image 402 is replaced with the face depicted in rendered image 452.

In some cases, the input image 402 may be a low-resolution and/or low-quality image. A 3D mesh generated based on input image 402 may, therefore, include geometric imperfections and/or include fewer details compared to 3D meshes generated from images captured by high resolution and/or multi-view camera systems. As discussed above, a decoder is trained using a plurality of training images, which can depict a face of a person from a variety of viewpoints. Training the decoder using images depicting different viewpoints allows the decoder to learn to produce a more accurate 3D mesh from just an image of the person. The average geometry and the geometry delta generated by a decoder include corrections to the 3D mesh that are learned by the decoder during the training process.

Further, although examples are described herein primarily with respect to comb network models, embodiments may use any technically-feasible machine learning model, such as other types of image-to-image translation neural networks. In particular, any machine learning model that can generate identity-specific output can be used. For example, an AdaIN (adaptive instance normalization) model can be used. Instead of a plurality of decoders that each correspond to different facial identities, the AdaIN model includes a single decoder that comprises different sets of layers. Each set of layers corresponds to a different facial identity. Using the AdaIN model, or any other machine learning model that can generate identity-specific output, is performed in a manner similar to that described above with respect to the comb network model 410. The set of layers, weights, and/or other machine learning model parameters that correspond to a target facial identity are used to generate identity-specific output associated with the target facial identity.

Figure 5:
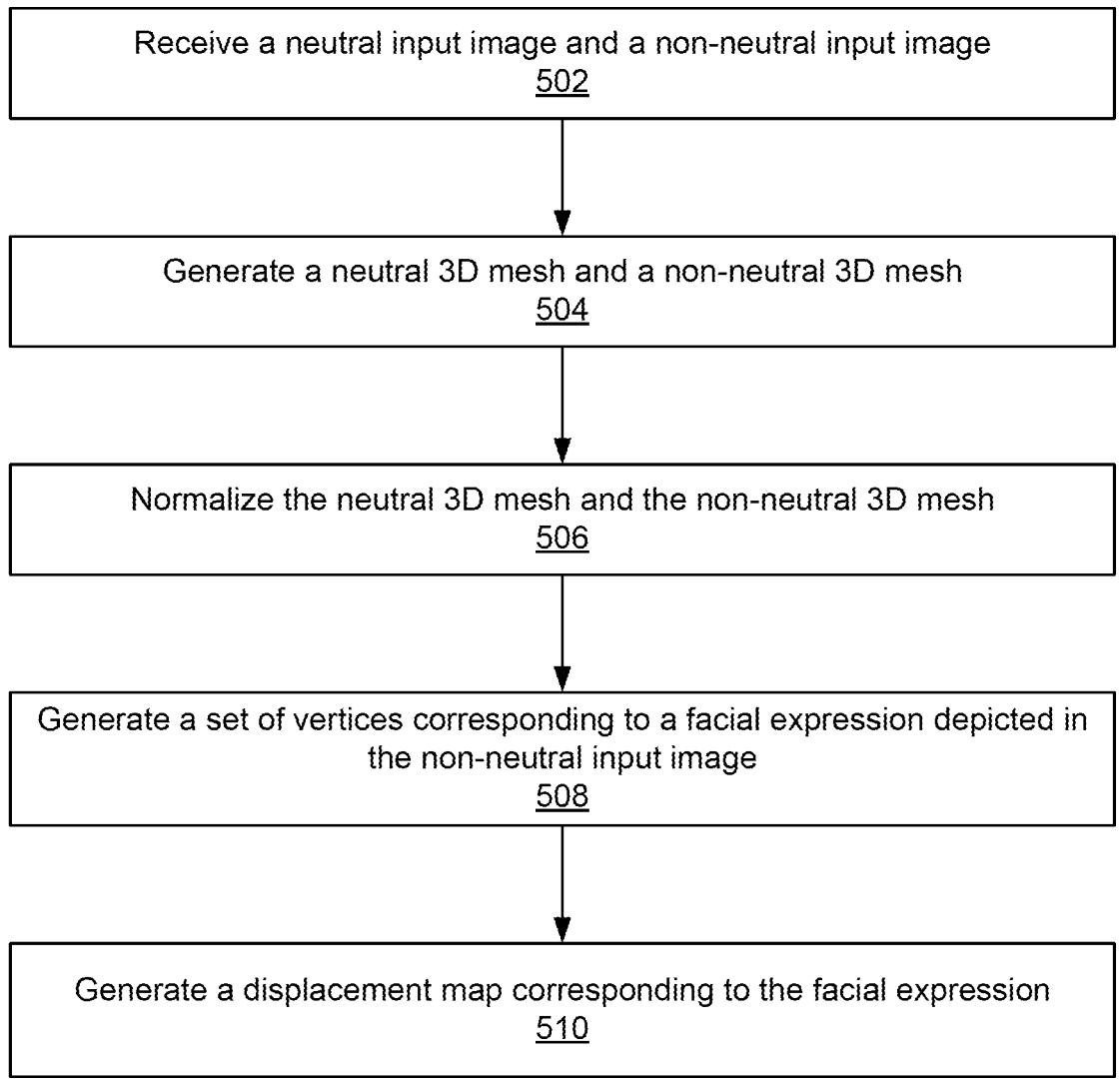
FIG. 5 is a flow diagram of method steps for pre-processing an image, according to various embodiments.

FIG. 5 is a flow diagram of method steps for pre-processing an image, according to various embodiments. Although the method steps are described in conjunction with the systems of FIGS. 1 and 2, persons skilled in the art will understand that any system configured to perform the method steps in any order falls within the scope of the present disclosure.

At step 502, pre-processing engine 118 receives a neutral input image and a non-neutral input image. The neutral input image depicts a face with a neutral expression. The non-neutral input image depicts the same face with a facial expression. In some embodiments, the neutral input image and the non-neutral input image capture the face from the same, or similar, distance and/or angle. Additionally, the neutral input image and the non-neutral input image can depict the face in substantially the same pose, such as the angle of the face from the camera, the tilt of the head, the position of the head relative to the rest of the body, and so forth.

At step 504, pre-processing engine 118 generates a neutral 3D mesh and a non-neutral 3D mesh based on the neutral input image and the non-neutral input image, respectively. Generating the neutral 3D mesh and the non-neutral 3D mesh is performed in a manner similar to that disclosed above with respect to 3D reconstruction module 210. In some embodiments, pre-processing engine 118 applies one or more 3D reconstruction algorithms to the neutral input image and the non-neutral 3D mesh to generate the neutral 3D mesh and the non-neutral 3D mesh, respectively.

At step 506, pre-processing engine 118 normalizes the neutral 3D mesh and the non-neutral 3D mesh. Normalizing the neutral 3D mesh and the non-neutral 3D mesh is performed in a manner similar to that disclosed above with respect to normalization module 220. In some embodiments, normalizing the neutral 3D mesh and/or the non-neutral 3D mesh includes applying an amount of rotation to the neutral 3D mesh and/or non-neutral 3D mesh to align the neutral 3D mesh and/or non-neutral 3D mesh along a vertical and/or horizontal axis. In some embodiments, normalizing the neutral 3D mesh and/or the non-neutral 3D mesh includes applying an amount of translation to the neutral 3D mesh and/or non-neutral 3D mesh to center the neutral 3D mesh and/or non-neutral 3D mesh within the 3D space. In some embodiments, normalizing the neutral 3D mesh and/or the non-neutral 3D mesh includes applying an amount of translation and an amount of rotation to the neutral 3D mesh and/or non-neutral 3D mesh to center the neutral 3D mesh and/or non-neutral 3D mesh within the 3D space.

At step 508, pre-processing engine 118 generates a set of vertices corresponding to a facial expression depicted in the non-neutral input image. The set of vertices represents the 3D displacement that is applied to the neutral facial expression in the neutral input image to form the non-neutral facial expression. Generating the set of vertices corresponding to the facial expression is performed in a manner similar to that disclosed above with respect to displacement map generation module 230. In some embodiments, generating the set of vertices includes subtracting the normalized neutral 3D mesh from the normalized non-neutral 3D mesh. The set of vertices indicates differences between the vertices of the normalized non-neutral 3D mesh and the vertices of the normalized neutral 3D mesh.

At step 510, pre-processing engine 118 generates a displacement map corresponding to the facial expression depicted in the non-neutral input image. Generating the displacement map is performed in a manner similar to that disclosed above with respect to displacement map generation module 230. In some embodiments, pre-processing engine maps each vertex displacement value into 2D space based on a UV map. The UV map indicates correspondences between points in 3D space and 2D points in the displacement map.

Figure 6:
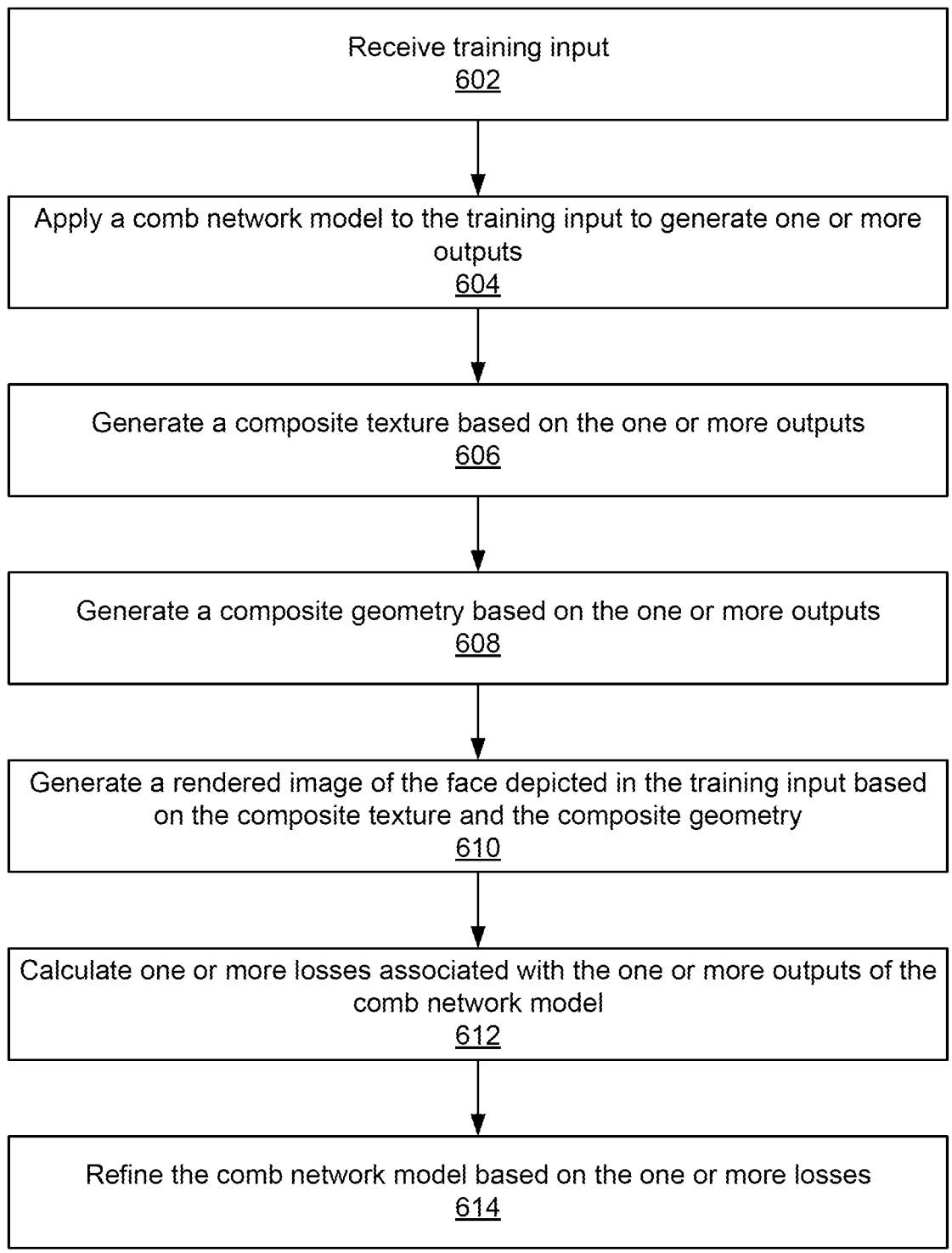
FIG. 6 is a flow diagram of method steps for training a machine learning model for changing the facial identity of a face in an image, according to various embodiments.

FIG. 6 is a flow diagram of method steps for training a machine learning model for changing the facial identity of a face in an image, according to various embodiments. Although the method steps are described in conjunction with the systems of FIGS. 1 and 3, persons skilled in the art will understand that any system configured to perform the method steps in any order falls within the scope of the present disclosure.

At step 602, training engine 120 receives training input for training a comb network model. In some embodiments, the training input comprises a normalized image depicting a face of a person. Additionally, in some embodiments, the training input includes a vertex displacement map corresponding to the image.

At step 604, training engine 120 applies the comb network model to the training input to generate one or more outputs. In some embodiments, training engine 120 inputs a normalized image into the comb network model. In some embodiments, training engine 120 inputs the normalized image and a vertex displacement map corresponding to the image into the comb network model. In some embodiments, the comb network model receives the training input and generates, based on the training input, an average texture, a texture delta, an average geometry, and a geometry delta. As discussed above, the average texture and average geometry are associated with the specific facial identity in the training input. The average texture is a 2D texture that represents an average texture map for the face corresponding to the specific facial identity. The average geometry is a 2D position map that represents the average geometry of the face corresponding to the specific facial identity. The texture delta and geometry delta represent adjustments to the average texture and average geometry, respectively, based on the specific input image.

At step 606, training engine 120 generates a composite texture based on the one or more outputs. The composite texture is a 2D texture that represents a texture of the face depicted in the training input image. Generating the composite texture is performed in a manner similar to that discussed above with respect to texture composite module 330. In some embodiments, training engine 120 generates the composite texture based on an average texture and a texture delta. Training engine 120 combines the average texture and the texture delta to generate the composite texture. Combining the average texture and the texture delta includes, for each pixel of the average texture, modifying the pixel value based on a corresponding pixel in the texture delta. The modified pixel value is used as the value of the corresponding pixel in composite texture.

At step 608, training engine 120 generates a composite geometry based on the one or more inputs. The composite geometry is a 3D mesh that represents a geometry of the face depicted in the training input image. Generating the composite geometry is performed in a manner similar to that discussed above with respect to geometry composite module 340. In some embodiments, training engine 120 generates the composite geometry based on an average geometry and a geometry delta.

In some embodiments, generating the composite geometry includes combining the average geometry and geometry delta to generate a combined position map. The combined position map is a 2D position map that represents the facial geometry of the face depicted in training input image. Combining the average geometry and the geometry delta includes, for each pixel of the average geometry, modifying the pixel value based on a corresponding pixel in the geometry delta. The modified pixel value is used as the value of the corresponding pixel in the combined position map.

In some embodiments, generating the composite geometry is further based on a vertex displacement map corresponding to the training input image. Training engine 120 modifies the combined position map based on the vertex displacement map. In some embodiments, modifying the combined position map based on the vertex displacement map includes, for each pixel of the combined position map, modifying the pixel value based on a corresponding pixel in the vertex displacement map.

Training engine 120 generates a 3D mesh based on the combined position map. In some embodiments, training engine 120 maps each pixel of the combined position map into 3D space. Training engine 120 performs bilinear interpolation of the combined position map with a UV map to generate the 3D mesh. The UV map indicates correspondences between 2D points in the combined position map and points in 3D space.

In some embodiments, after generating the composite geometry, training engine 120 rotates and/or translates the composite geometry. Training engine 120 receives an amount of rotation and an amount of translation generated by pre-processing engine 118 when generating the vertex displacement map based on the training input image. The amount of rotation corresponds to an amount of rotation applied by pre-processing engine 118 when normalizing the 3D meshes used to generate the vertex displacement map. The amount of translation corresponds to the amount of translation applied by pre-processing engine 118 when normalizing the 3D meshes used to generate the vertex displacement map. Training engine 120 adjusts the rotation and translation of the composite geometry, based on the amount of rotation and the amount of translation, to remove the rotation and translation applied by pre-processing engine 118 from the composite geometry.

At step 610, training engine 120 generates a rendered image of the face depicted in the training input image based on the composite texture and the composite geometry. Generating the rendered image is performed in a manner similar to that discussed above in conjunction with rendering module 350. The rendered image is a 2D image that depicts the face generated using the comb network model based on the training input image. For training purposes, the rendered image has the same facial identity as the training input image. In some embodiments, generating the rendered image includes applying the composite texture to the composite geometry, and rendering the resulting textured 3D model into a 2D image.

At step 612, training engine 120 calculates one or more losses associated with the output generated by the comb network model. In some embodiments, the one or more losses include a reconstruction loss, a silhouette loss, and a smoothing loss. A reconstruction loss represents a difference between the training input image and the rendered image. A silhouette loss represents a difference between the silhouette of the composite geometry and a silhouette of the face depicted in the training input image. In some embodiments, training engine 120 extracts the silhouette of the face depicted in the training input image using one or more image segmentation techniques. A smoothing loss represents a difference between the composite geometry and a 3D mesh corresponding to the training input image. The 3D mesh can be generated by pre-processing engine 118 based on the training input image and provided to training engine 120 as part of the training input.

At step 614, training engine 120 refines the comb network model based on the one or more losses. Refining the comb network model includes adjusting the weights and/or neurons of the encoder and/or decoder. Training engine 120 trains the comb network model to minimize the one or more losses.

In some embodiments, the training input is associated with a particular facial identity. The above steps 602 through 614 are repeated for a set of training inputs that are also associated with the particular facial identity to train a decoder corresponding to the particular facial identity. Additionally, the above steps 602 through 614 can be repeated for different sets of training inputs that are each associated with a different facial identity to train different decoders corresponding to the different facial identities. The above steps 602-614 can also be performed in a different order and/or in parallel. For example, step 608 could be performed prior to, or at the same time as, step 606.

Figure 7:
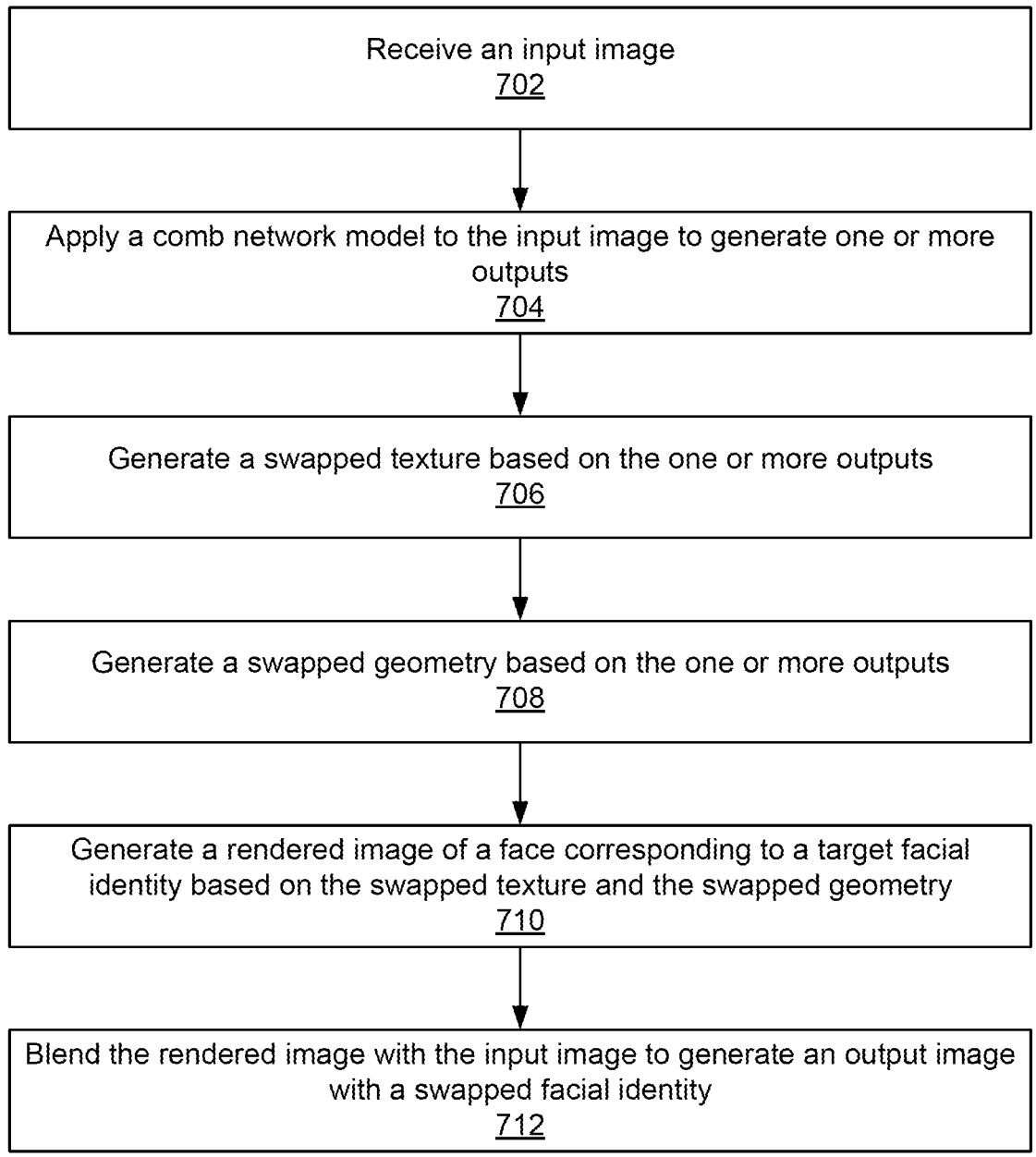
FIG. 7 is a flow diagram of method steps for using a machine learning model to change the facial identity of a face in an image, according to various embodiments.

FIG. 7 is a flow diagram of method steps for using a machine learning model to change the facial identity of a face in an image, according to various embodiments. Although the method steps are described in conjunction with the systems of FIGS. 1 and 4, persons skilled in the art will understand that any system configured to perform the method steps in any order falls within the scope of the present disclosure.

At step 702, execution engine 122 receives an input image. The input image is a normalized image that depicts a face of a person. The input image is associated with a first facial identity to be changed into a second, target facial identity. In some embodiments, if the input image is not a normalized image, then execution engine 122 normalizes the input image. Additionally, in some embodiments, execution engine 122 receives a vertex displacement map corresponding to the input image.

At step 704, execution engine 122 applies a trained comb network model to the input image to generate one or more outputs. In some embodiments, execution engine 122 inputs the input image into the trained comb network model. In some embodiments, execution engine 122 inputs the input image and a vertex displacement map corresponding to the input image into the trained comb network model. The trained comb network model receives the input image and, optionally, the vertex displacement map, and generates an average texture, a texture delta, an average geometry, and a geometry delta. In some embodiments, the trained comb network model includes a plurality of decoders. Each decoder is associated with a different facial identity. The decoder associated with the target facial identity is used to generate the one or more outputs. Accordingly, the average texture, texture delta, average geometry, and geometry delta correspond to the target facial identity.

At step 706, execution engine 122 generates a swapped texture based on the one or more outputs. The swapped texture is a 2D texture that represents a texture of a face corresponding to the target facial identity. Generating the composite texture is performed in a manner similar to that discussed above with respect to texture composite module 430. In some embodiments, execution engine 122 generates the swapped texture based on an average texture and a texture delta. Execution engine 122 combines the average texture and the texture delta to generate the composite texture. Combining the average texture and the texture delta includes, for each pixel of the average texture, modifying the pixel value based on a corresponding pixel in the texture delta. The modified pixel value is used as the value of the corresponding pixel in composite texture.

At step 708, execution engine 122 generates a swapped geometry based on the one or more outputs. The swapped geometry is a 3D mesh that represents a geometry of the face corresponding to the target facial identity. Generating the swapped geometry is performed in a manner similar to that discussed above with respect to geometry composite module 440. In some embodiments, execution engine 122 generates the swapped geometry based on an average geometry and a geometry delta.

In some embodiments, generating the swapped geometry includes combining the average geometry and geometry delta to generate a combined position map. The combined position map is a 2D position map that represents the facial geometry of the face corresponding to the target facial identity. Combining the average geometry and the geometry delta includes, for each pixel of the average geometry, modifying the pixel value based on a corresponding pixel in the geometry delta. The modified pixel value is used as the value of the corresponding pixel in the combined position map.

In some embodiments, generating the swapped geometry is further based on a vertex displacement map corresponding to the input image. Execution engine 122 modifies the combined position map based on the vertex displacement map. In some embodiments, modifying the combined position map based on the vertex displacement map includes, for each pixel of the combined position map, modifying the pixel value based on a corresponding pixel in the vertex displacement map.

Execution engine 122 generates a 3D mesh based on the combined position map. In some embodiments, execution engine 122 maps each pixel of the combined position map into 3D space. Execution engine 122 performs bilinear interpolation of the combined position map with a UV map to generate the 3D mesh. The UV map indicates correspondences between 2D points in the combined position map and points in 3D space.

In some embodiments, after generating the composite geometry, execution engine 122 rotates and/or translates the swapped geometry. Execution engine 122 receives an amount of rotation and an amount of translation generated by pre-processing engine 118 when generating the vertex displacement map based on the input image. The amount of rotation corresponds to an amount of rotation applied by pre-processing engine 118 when normalizing the 3D meshes used to generate the vertex displacement map. The amount of translation corresponds to the amount of translation applied by pre-processing engine 118 when normalizing the 3D meshes used to generate the vertex displacement map. Execution engine 122 adjusts the rotation and translation of the swapped geometry, based on the amount of rotation and the amount of translation, to remove the rotation and translation applied by pre-processing engine 118 from the swapped geometry.

At step 710, execution engine 122 generates a rendered image of the face corresponding to the target facial identity based on the swapped texture and the swapped geometry. Generating the rendered image is performed in a manner similar to that discussed above in conjunction with rendering module 450. The rendered image is a 2D image that depicts the face generated using the trained comb network model, based on the input image. The face depicted in the rendered image is the face depicted in the input image, but with the facial identity changed to the target facial identity.

Optionally, at step 712, execution engine 122 blends the rendered image with the input image to generate an output image with the swapped facial identity. The output image includes the face depicted in rendered image and non-facial regions depicted in the input image, such as hair, body, clothing, background elements, and so forth. In some embodiments, blending the rendered image with the input image includes performing one or more image segmentation operations on the input image to identify the portion of the input image corresponding to the face depicted in the input image and the portions of the input image corresponding to one or more non-facial regions depicted in the input image. In the output image, the face depicted in the input image is replaced by the face depicted in the rendered image.

In various embodiments, the steps 702-712 can be performed in a different order and/or in parallel. For example, step 708 could be performed prior to, or at the same time as, step 706.

In sum, techniques are disclosed for changing the facial identities of faces shown in video frames and images. An image-to-image translation network model is trained to receive an input image having a first facial identity and swap the first facial identity with a second facial identity to generate an output image having the second facial identity. In some embodiments, the image-to-image translation network model is a comb network model that includes an encoder and a plurality of decoders. Each decoder is trained using training data corresponding to a different facial identity. After training, each decoder generates output corresponding to the different facial identity. In some embodiments, training the comb network model includes using the comb network model to generate output images and/or 3D meshes that depict faces with the same facial identity as the training images. The comb network model is trained to minimize losses between the output images and the training images and/or losses between the 3D meshes and the training images.

To swap the facial identity of the input image from the first facial identity to the second facial identity, the input image is provided to the trained comb network model. The decoder corresponding to the second facial identity is used to generate one or more outputs of the comb network model. In some embodiments, the comb network model generates an average texture and a texture delta. The average texture and texture delta are combined to produce a texture of a face having the second facial identity. The comb network model also generates an average geometry and a geometry delta. The average geometry and the geometry delta are combined to produce a 3D mesh of the face having the second facial identity. In some embodiments, the 3D mesh is modified to apply an expression depicted in the input image. In some embodiments, the 3D mesh is also rotated and/or translated to reproduce the facial pose depicted in the input image. An output image is rendered based on the 3D mesh of the face and the texture of the face. The output image depicts the face having the second facial identity. Additionally, in some embodiments, the output image depicts the context surrounding the face in the input image, such as the image background and the non-facial portions of the person depicted in the input image.

At least one technical advantage of the disclosed techniques relative to the prior art is that the disclosed techniques can be effectively utilized to change (i.e., replace or modify) facial identities in video frames and images where perfect 3D meshes of the faces being modified are not available. In particular, the disclosed techniques enable realistic-looking facial changes to be made in the video frames and images, while reducing or eliminating the unwanted artifacts produced by conventional techniques when inaccurate or imperfect 3D meshes are used. These technical advantages represent one or more technological improvements over prior art approaches.

1. In some embodiments, a computer-implemented method for changing a face within an image comprises receiving a first image including a face associated with a first facial identity; generating, via a machine learning model, at least a first texture map and a first position map based on the first image; and rendering a second image including a face associated with a second facial identity based on the first texture map and the first position map, wherein the second facial identity is different from the first facial identity.
2. The method of clause 1, wherein the machine learning model comprises an encoder and a plurality of decoders, wherein each decoder included in the plurality of decoders is associated with a different facial identity, and wherein generating the first texture map and the first position map uses a first decoder included in the plurality of decoders that is associated with the second facial identity.
3. The method of clauses 1 or 2, wherein the machine learning model comprises a decoder including a plurality of sets of layers, wherein each set of layers included in the plurality of sets of layers is associated with a different facial identity, and wherein generating the first texture map and the first position map uses a first set of layers included in the plurality of sets of layers that is associated with the second facial identity.
4. The method of any of clauses 1-3, wherein the first texture map represents an average texture map corresponding to the second facial identity, the method further comprising generating a second texture map that represents one or more adjustments to the average texture map, wherein rendering the second image is further based on the second texture map.
5. The method of any of clauses 1-4, wherein rendering the second image comprises generating a composite texture map based on the first texture map and the second texture map.
6. The method of any of clauses 1-5, further comprising training the machine learning model based on a plurality of training input images, wherein the plurality of training input images includes one or more neutral input images associated with the first facial identity, one or more neutral input images associated with the second facial identity, one or more non-neutral input images associated with the first facial identity, and one or more non-neutral input images associated with the second facial identity.
7. The method of any of clauses 1-6, wherein training the machine learning model comprises, for each training input image included in the plurality of training input images generating, using the machine learning model, training output corresponding to the training input image; computing one or more of a reconstruction loss, a silhouette loss, or a smoothing loss based on the training output; and refining the machine learning model based on the one or more of the reconstruction loss, the silhouette loss, or the smoothing loss.
8. The method of any of clauses 1-7, wherein the machine learning model comprises a plurality of decoders, wherein each decoder included in the plurality of decoders corresponds to a different facial identity, and the method further comprises training each decoder included in the plurality of decoders based on a different set of training images associated with the corresponding facial identity.
9. The method of any of clauses 1-8, further comprising generating a 3D mesh based on the composite position map; and modifying the 3D mesh based on the first image.
10. The method of any of clauses 1-9, further comprising generating a vertex displacement map based on the first image, wherein generating the first texture map and the first position map is further based on the vertex displacement map.
11. In some embodiments, one or more non-transitory computer-readable media include instructions that, when executed by one or more processors, cause the one or more processors to perform the steps of receiving a first image including a face associated with a first facial identity; generating, via a machine learning model, at least a first texture map and a first position map based on the first image; and rendering a second image including a face associated with a second facial identity based on the first texture map and the first position map, wherein the second facial identity is different from the first facial identity.
12. The non-transitory computer-readable media of clause 11, wherein the machine learning model comprises an encoder and a plurality of decoders, wherein each decoder included in the plurality of decoders is associated with a different facial identity, and wherein generating the first texture map and the first position map uses a first decoder included in the plurality of decoders that is associated with the second facial identity.
13. The non-transitory computer-readable media of clauses 11 or 12, wherein the first texture map represents an average texture map corresponding to the second facial identity, wherein the instructions, when executed by the one or more processors, further cause the one or more processors to perform the step of generating a second texture map that represents one or more adjustments to the average texture map, and wherein rendering the second image is further based on the second texture map.
14. The non-transitory computer-readable media of any of clauses 11-13, wherein rendering the second image comprises generating a composite texture map based on the first texture map and the second texture map.
15. The non-transitory computer-readable media of any of clauses 11-14, wherein the first position map represents an average geometry corresponding to the second facial identity, wherein the instructions, when executed by the one or more processors further cause the one or more processors to perform the step of generating a second position map that represents one or more adjustments to the average geometry, and wherein rendering the second image is further based on the second position map.
16. The non-transitory computer-readable media of any of clauses 11-15, wherein rendering the second image comprises generating a composite position map based on the first position map and the second position map.
17. The non-transitory computer-readable media of any of clauses 11-16, wherein the instructions, when executed by the one or more processors, further cause the one or more processors to perform the step of generating a vertex displacement map based on the first image, and wherein generating the composite position map is further based on the vertex displacement map.

18. The non-transitory computer-readable media of any of clauses 11-17, wherein the instructions, when executed by the one or more processors, further cause the one or more processors to perform the steps of generating a 3D mesh based on the composite position map; and modifying the 3D mesh based on the first image.

19. The non-transitory computer-readable media of any of clauses 11-18, wherein the instructions, when executed by the one or more processors, further cause the one or more processors to perform the step of generating a vertex displacement map based on the first image, wherein generating the first texture map and the first position map is further based on the vertex displacement map.

20. In some embodiments, a system comprises one or more memories storing instructions; one or more processors that are coupled to the one or more memories and, when executing the instructions, are configured to receive a first image including a face associated with a first facial identity; generate, via a machine learning model, at least a first texture map and a first position map based on the first image; and render a second image including a face associated with a second facial identity based on the first texture map and the first position map, wherein the second facial identity is different from the first facial identity.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine.

The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for changing a face within an image, the method comprising:
receiving a first image including a face associated with a first facial identity;
generating, via a machine learning model, at least a first texture map, a second texture map, and a first position map based on the first image, wherein the second texture map represents one or more adjustments to the first texture map; and
rendering a second image including a face associated with a second facial identity based on the first texture map, the first position map, and the second texture map, wherein the second facial identity is different from the first facial identity.

2. The method of claim 1, wherein the machine learning model comprises an encoder and a plurality of decoders, wherein each decoder included in the plurality of decoders is associated with a different facial identity, and wherein generating the first texture map and the first position map uses a first decoder included in the plurality of decoders that is associated with the second facial identity.

3. A computer-implemented method for changing a face within an image, the method comprising:
  receiving a first image including a face associated with a first facial identity;
  generating, via a machine learning model, wherein the machine learning model comprises a decoder including a plurality of sets of layers, wherein each set of layers included in the plurality of sets of layers is associated with a different facial identity, and wherein generating the first texture map and the first position map uses a first set of layers included in the plurality of sets of layers that is associated with the second facial identity; and
  rendering a second image including a face associated with a second facial identity based on the first texture map and the first position map, wherein the second facial identity is different from the first facial identity.

4. The method of claim 1, wherein the first texture map represents an average texture map corresponding to the second facial identity, and the second texture map represents one or more adjustments to the average texture map.

5. The method of claim 1, wherein rendering the second image comprises generating a composite texture map based on the first texture map and the second texture map.

6. The method of claim 1, further comprising training the machine learning model based on a plurality of training input images, wherein the plurality of training input images includes one or more neutral input images associated with the first facial identity, one or more neutral input images associated with the second facial identity, one or more non-neutral input images associated with the first facial identity, and one or more non-neutral input images associated with the second facial identity.

7. The method of claim 6, wherein training the machine learning model comprises, for each training input image included in the plurality of training input images:
  generating, using the machine learning model, training output corresponding to the training input image;
  computing one or more of a reconstruction loss, a silhouette loss, or a smoothing loss based on the training output; and
  refining the machine learning model based on the one or more of the reconstruction loss, the silhouette loss, or the smoothing loss.

8. The method of claim 1, wherein the machine learning model comprises a plurality of decoders, wherein each decoder included in the plurality of decoders corresponds to a different facial identity, the method further comprises training each decoder included in the plurality of decoders based on a different set of training images associated with the corresponding facial identity.

9. The method of claim 1, wherein rendering the second image comprises generating a 3D mesh based on the first position map, wherein rendering the second image is further based on the 3D mesh.

10. The method of claim 1, further comprising generating a vertex displacement map based on the first image, wherein generating the first texture map and the first position map is further based on the vertex displacement map.

11. One or more non-transitory computer-readable media including instructions that, when executed by one or more processors, cause the one or more processors to perform the steps of:
  receiving a first image including a face associated with a first facial identity;
  generating, via a machine learning model, at least a first texture map, a second texture map, and a first position map based on the first image, wherein the second texture map comprises one or more adjustments to the first texture map; and
  rendering a second image including a face associated with a second facial identity based on the first texture map, the first position map, and the second texture map, wherein the second facial identity is different from the first facial identity.

12. The non-transitory computer-readable media of claim 11, wherein the machine learning model comprises an encoder and a plurality of decoders, wherein each decoder included in the plurality of decoders is associated with a different facial identity, and wherein generating the first texture map and the first position map uses a first decoder included in the plurality of decoders that is associated with the second facial identity.

13. The non-transitory computer-readable media of claim 11, wherein the first texture map represents an average texture map corresponding to the second facial identity, and the second texture map represents one or more adjustments to the average texture map.

14. The non-transitory computer-readable media of claim 11, wherein rendering the second image comprises generating a composite texture map based on the first texture map and the second texture map.

15. The non-transitory computer-readable media of claim 11, wherein the first position map represents an average geometry corresponding to the second facial identity, wherein the instructions, when executed by the one or more processors further cause the one or more processors to perform the step of generating a second position map that represents one or more adjustments to the average geometry, and wherein rendering the second image is further based on the second position map.

16. The non-transitory computer-readable media of claim 15, wherein rendering the second image comprises generating a composite position map based on the first position map and the second position map.

17. The non-transitory computer-readable media of claim 16, wherein the instructions, when executed by the one or more processors, further cause the one or more processors to perform the step of generating a vertex displacement map based on the first image, and wherein generating the composite position map is further based on the vertex displacement map.

18. The non-transitory computer-readable media of claim 16, wherein the instructions, when executed by the one or more processors, further cause the one or more processors to perform the steps of:
  generating a 3D mesh based on the composite position map; and
  modifying the 3D mesh based on the first image.

19. The non-transitory computer-readable media of claim 11, wherein the instructions, when executed by the one or more processors, further cause the one or more processors to perform the step of generating a vertex displacement map based on the first image, wherein generating the first texture map and the first position map is further based on the vertex displacement map.

20. A system comprising:
one or more memories storing instructions;
one or more processors that are coupled to the one or more memories and, when executing the instructions, are configured to:
receive a first image including a face associated with a first facial identity;
generate, via a machine learning model, at least a first texture map, a second texture map, and a first position map based on the first image, wherein the second texture map comprises one or more adjustments to the first texture map; and
render a second image including a face associated with a second facial identity based on the first texture map, the first position map, and the second texture map, wherein the second facial identity is different from the first facial identity.

* * * * *